(12) United States Patent
Novak et al.

(10) Patent No.: US 9,519,787 B2
(45) Date of Patent: Dec. 13, 2016

(54) SECURE CREATION OF ENCRYPTED VIRTUAL MACHINES FROM ENCRYPTED TEMPLATES

(71) Applicant: Microsoft Technology Licensing, LLC, Redmond, WA (US)

(72) Inventors: Mark Fishel Novak, Newcastle, WA (US); Nir Ben-Zvi, Bellevue, WA (US); John Anthony Messec, Bellevue, WA (US); Kinshuman Kinshumann, Redmond, WA (US); Christopher McCarron, Hartford, CT (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

(21) Appl. No.: 14/542,341

(22) Filed: Nov. 14, 2014

(65) Prior Publication Data
US 2016/0140343 A1    May 19, 2016

(51) Int. Cl.
*G06F 15/177* (2006.01)
*G06F 21/57* (2013.01)
*G06F 9/44* (2006.01)

(52) U.S. Cl.
CPC .......... *G06F 21/575* (2013.01); *G06F 9/4416* (2013.01); *G06F 2221/034* (2013.01)

(58) Field of Classification Search
CPC ....................................................... H04L 9/32
(Continued)

(56) References Cited

U.S. PATENT DOCUMENTS 7,380,119 B2   5/2008   Bade et al.
7,836,299 B2   11/2010  England et al.
(Continued)

FOREIGN PATENT DOCUMENTS

EP   2577539    4/2013
WO   WO 0163831   8/2001
(Continued)

OTHER PUBLICATIONS

U.S. Appl. No. 61/988,786, filed May 5, 2014, Nystrom et al.
(Continued)

*Primary Examiner* — Vincent Tran
(74) *Attorney, Agent, or Firm* — Aneesh Mehta; Kate Drakos; Micky Minhas

(57) ABSTRACT

Booting a machine in a secure fashion in a potentially unsecure environment. The method includes a target machine beginning a boot process. The method further includes the target machine determining that it needs provisioning data to continue booting. The target machine contacts a secure infrastructure to obtain the provisioning data. The target machine provides an identity claim that can be verified by the secure infrastructure. As a result of the secure infrastructure verifying the identity claim, the target machine receives a request from the secure infrastructure to establish a key sealed to the target machine. The target machine provides the established key to the secure infrastructure. The target machine receives the provisioning data from the secure infrastructure. The provisioning data is encrypted to the established key. The target machine decrypts the encrypted provisioning data, and uses the provisioning data to finish booting.

17 Claims, 4 Drawing Sheets

(58) Field of Classification Search
USPC ........................................................ 713/1, 2
See application file for complete search history.

(56) References Cited

U.S. PATENT DOCUMENTS

| | | | |
|---|---|---|---|
| 7,860,802 B2 | 12/2010 | Pandya et al. | |
| 8,060,876 B2 | 11/2011 | Smith et al. | |
| 8,065,713 B1 | 11/2011 | Vainstein et al. | |
| 8,074,262 B2 | 12/2011 | Scarlata | |
| 8,151,262 B2 | 4/2012 | Challener et al. | |
| 8,208,637 B2 | 6/2012 | Ellison | |
| 8,249,257 B2 | 8/2012 | Brutch et al. | |
| 8,341,427 B2 | 12/2012 | Auradkar et al. | |
| 8,356,347 B2 | 1/2013 | Berger et al. | |
| 8,375,437 B2 | 2/2013 | Linsley et al. | |
| 8,411,863 B2 | 4/2013 | Ureche et al. | |
| 8,909,939 B1 | 12/2014 | Beda, III et al. | |
| 9,172,683 B2 | 10/2015 | Farrugia et al. | |
| 2001/0055396 A1 | 12/2001 | Jevans | |
| 2003/0226031 A1 | 12/2003 | Proudler et al. | |
| 2005/0166051 A1 | 7/2005 | Buer | |
| 2006/0020781 A1 | 1/2006 | Scarlata et al. | |
| 2006/0126836 A1 | 6/2006 | Rivas | |
| 2006/0155988 A1 | 7/2006 | Hunter et al. | |
| 2006/0256108 A1 | 11/2006 | Scaralata | |
| 2007/0016801 A1 | 1/2007 | Bade et al. | |
| 2007/0094719 A1 | 4/2007 | Scarlata | |
| 2008/0046581 A1 | 2/2008 | Molina et al. | |
| 2008/0209221 A1 | 8/2008 | Vennelakanti et al. | |
| 2008/0244569 A1 | 10/2008 | Challenger et al. | |
| 2009/0064292 A1 | 3/2009 | Carter et al. | |
| 2009/0086979 A1 | 4/2009 | Brutch et al. | |
| 2009/0125974 A1 | 5/2009 | Zhang et al. | |
| 2009/0154709 A1 | 6/2009 | Ellison | |
| 2009/0204964 A1 | 8/2009 | Foley | |
| 2009/0271618 A1 | 10/2009 | Camenisch et al. | |
| 2009/0307487 A1 | 12/2009 | Movva et al. | |
| 2010/0082960 A1* | 4/2010 | Grobman | G06F 21/575 713/2 |
| 2010/0325628 A1 | 12/2010 | Haga et al. | |
| 2011/0029672 A1 | 2/2011 | Agneeswaran | |
| 2011/0154031 A1 | 6/2011 | Banerjee et al. | |
| 2011/0202916 A1 | 8/2011 | VoBa et al. | |
| 2011/0246757 A1* | 10/2011 | Prakash | G06F 21/305 713/2 |
| 2011/0302415 A1* | 12/2011 | Ahmad | G06F 21/57 713/168 |
| 2012/0030676 A1 | 2/2012 | Smith et al. | |
| 2012/0089831 A1 | 4/2012 | Rozas | |
| 2012/0117565 A1 | 5/2012 | Staelin et al. | |
| 2012/0204020 A1 | 8/2012 | Novak et al. | |
| 2012/0265976 A1 | 10/2012 | Spiers et al. | |
| 2012/0328105 A1 | 12/2012 | Mukkara et al. | |
| 2013/0054979 A1 | 2/2013 | Basmov et al. | |
| 2013/0086383 A1 | 4/2013 | Galvao de Andrade et al. | |
| 2013/0097296 A1 | 4/2013 | Gehrmann et al. | |
| 2013/0191648 A1 | 7/2013 | Bursell | |
| 2014/0007087 A1 | 1/2014 | Scott-Nash et al. | |
| 2014/0019753 A1 | 1/2014 | Lowry et al. | |
| 2014/0019959 A1 | 1/2014 | Dodgson et al. | |
| 2014/0025961 A1 | 1/2014 | Mackintosh et al. | |
| 2014/0052877 A1 | 2/2014 | Mao | |
| 2014/0075494 A1 | 3/2014 | Fadida et al. | |
| 2014/0089658 A1 | 3/2014 | Raghuram et al. | |
| 2014/0089660 A1 | 3/2014 | Sarangshar et al. | |
| 2014/0095868 A1 | 4/2014 | Korthny et al. | |
| 2014/0108784 A1 | 4/2014 | Pendarakis et al. | |
| 2014/0173279 A1* | 6/2014 | Goodman | G06F 21/73 713/168 |
| 2014/0201525 A1* | 7/2014 | Korthny | G06F 21/6218 713/165 |
| 2014/0281497 A1 | 9/2014 | Medvinsky et al. | |
| 2015/0019864 A1* | 1/2015 | Pate | G06F 21/53 713/168 |
| 2015/0127795 A1 | 5/2015 | Jagana et al. | |
| 2015/0134965 A1* | 5/2015 | Morenius | G06F 21/57 713/172 |
| 2015/0135311 A1 | 5/2015 | MacKintosh et al. | |
| 2015/0143508 A1* | 5/2015 | Halibard | G06F 9/24 726/18 |
| 2015/0178504 A1 | 6/2015 | Nystrom et al. | |
| 2015/0188917 A1* | 7/2015 | McCarron | H04L 9/3271 713/168 |
| 2015/0318986 A1 | 11/2015 | Novak et al. | |
| 2015/0319160 A1 | 11/2015 | Ferguson et al. | |

FOREIGN PATENT DOCUMENTS

| | | |
|---|---|---|
| WO | WO 2007087558 | 8/2007 |
| WO | 2009123640 | 10/2009 |
| WO | WO 2012024508 | 2/2012 |

OTHER PUBLICATIONS

"International Search Report and Written Opinion Issued in PCT Patent Application No. PCT/US2014/071773", Mailed Date: Mar. 23, 2015, 10 pages.

"International Preliminary Report on Patentability Issued in PCT Patent Application No. PCT/US2014/071773", Mailed Date: Nov. 19, 2015, 8 pages.

Aslam, et al., "Securely Launching Virtual Machines on Trustworthy Platforms in a Public Cloud—An Enterprise's Perspective", In Proceedings of the 2nd International Conference on Cloud Computing and Services Science, Apr. 18, 2012, 10 pages.

Goyette, Rich, "A Review of vTPM: Virtualizing the Trusted Platform Module", In Proceedings of Network Security and Cryptography, Nov. 13, 2007, 4 pages.

"International Search Report & Written Opinion for PCT Patent Application No. PCT/US2015/028991", Mailed Date: Aug. 20, 2015, 9 pages.

Garfinkel, et al., "Terra: A Virtual Machine-Based Platform for Trusted Computing", In Proceedings of the 19th ACM symposium on Operating systems principles, Oct. 19, 2003, 14 pages.

Berger, et al., "Security for the Cloud Infrastructure: Trusted Virtual Data Center Implementation", In Proceedings of IBM Journal of Research and Development, vol. 53, Issue 4, Jul. 2009, 12 pages.

Olzak, Tom, "Chapter 8—UEFI and the TPM: Building a foundation for platform trust", Published on: Jun. 19, 2012. Available at <<http://www.wayback.archive.org/web/20131018023117/http:/resources.infosecinstitute.com/uefi-and-tpm-2>>.

"International Search Report & Written Opinion Issued in PCT Application No. PCT/US2015/28995", Mailed Date: Aug. 26, 2015, 11 Pages.

U.S. Appl. No. 14/140,214, Feb. 12, 2016, Office Action.

U.S. Appl. No. 14/140,214, Nystrom, et al., "Virtual Machine Assurances", filed Dec. 24, 2013.

Berger, et al., "vTPM: Virtualizing the Trusted Platform Module", In Proceedings of the 15th conference on USENIX Security Symposium, vol. 15, Article No. 21, Jul. 31, 2006, pp. 305-320.

International Search Report and Written Opinion for PCT Application No. PCT/US2015/058700, mailed Jul. 18, 2016.

"Second Written Opinion Issued in PCT Application No. PCT/US2015/28995", Mailed Date : Mar. 16, 2016, 5 Pages.

"International Preliminary Report on Patentability Issued in PCT Application No. PCT/US2015/28991", Mailed Date: Apr. 4, 2016, 7 Pages.

Notice of Allowance dated May 25, 2016 in U.S. Appl. No. 14/504,096.

Office Action dated Dec. 20, 2016 in U.S. Appl. No. 14/481,399.

International Preliminary Report on Patentability for PCT Application No. PCT/US2015/028995, mailed Aug. 4, 2016.

Notice of Allowance dated Aug. 18, 2016 U.S. Appl. No. 14/140,214.

"Second Written Opinion Issued in PCT Application No. PCT/US2015/058700", Mailed Date: Sep. 28, 2016, 6 Pages.

(56) References Cited

OTHER PUBLICATIONS

Notice of Allowance dated Oct. 20, 2016 U.S. Appl. No. 14/504,096.

* cited by examiner

SECURE CREATION OF ENCRYPTED VIRTUAL MACHINES FROM ENCRYPTED TEMPLATES

BACKGROUND

Background and Relevant Art

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc).

In cloud computing environments, a tenant may include a user, company, department of a company or other entity that has rights to access one or more of the virtual machines (VMs) deployed, at a datacenter run by a cloud, service provider. Often, when a tenant wants to have VMs hosted in a datacenter, the tenant typically wants a large number of VMs to be created and hosted. If the tenant were to create and transfer all of these VMs from the tenant to the datacenter, large network traffic and computing resources would be required. However, many of the VMs to be launched are likely to be nearly or virtually identical. Thus, in some situations, a template may be provided to a datacenter which the datacenter can duplicate to create a large number of virtually identical VMs.

In a computing environment where the tenant in a datacenter places limited trust in the datacenter's staff. VMs sometimes have to be created in an encrypted form from templates that are likewise encrypted. VM creation from a template usually involves creating a copy of a template's virtual hard drive (VHD), but for reasons of cryptographic hygiene, every VHD is encrypted with a different key.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for booting a machine in a secure fashion in a potentially unsecure environment. The method includes a target machine beginning a hoot process. The method further includes the target machine determining that it needs provisioning data to continue hooting. The target machine contacts a secure infrastructure to obtain the provisioning data. The target machine provides an identity claim that can be verified by the secure infrastructure. As a result of the secure infrastructure verifying the identity claim, the target machine receives a request from the secure infrastructure to establish a key sealed to the target machine. The target machine provides the established key to the secure infrastructure. The target machine receives the provisioning data from the secure infrastructure. The provisioning data is encrypted to the established key. The target machine decrypts the encrypted provisioning data, and uses the provisioning data to finish booting.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
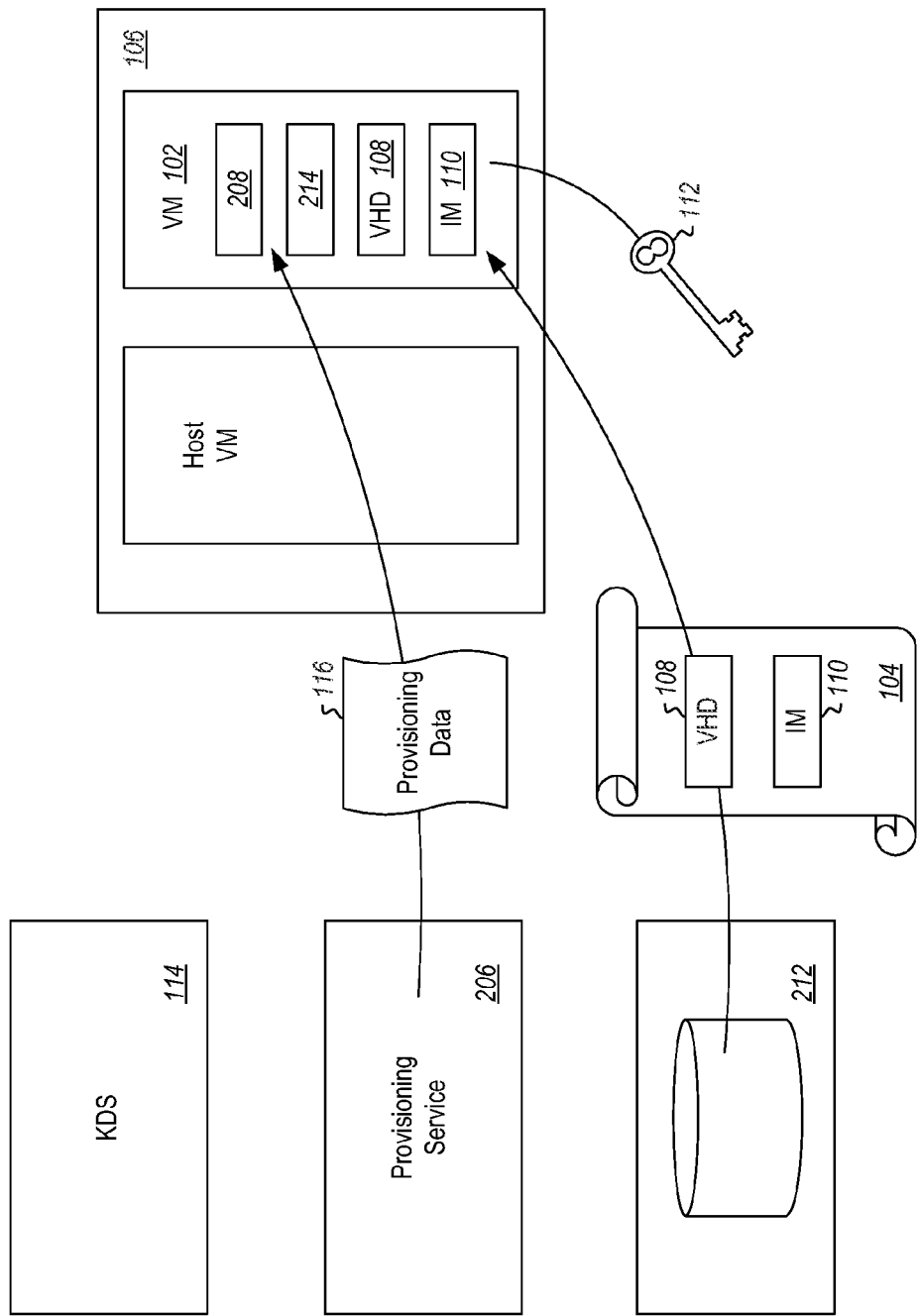
FIG. 1 illustrates a system for performing a rekeying operation prior to fully launching a virtual machine.

With reference now to FIG. 1, some embodiments described herein implement a method of performing a rekeying operation prior to fully launching a virtual machine (VM) 102 in a secure fashion. In some embodiments, this can be accomplished by deploying an encrypted VM 102 created from a template 104 to a host 106 where the template is encrypted by a volume encryption method performed on a virtual hard drive (VIM) 108 of the template. The encrypted VM 102 copy is provided to the host 106 and includes an initialization manager 110. The initialization manager 110 may be implemented, for example, using a technology such as the executable hoot manager software available from Microsoft Corporation of Redmond Wash.

The initialization manager 110 is executed. The initialization manager 110 is able to decrypt the VHD 108 and re-encrypt the VIM 108 to a new key 112 such that a VM 102 with a unique key is created. The VM 102 can then be fully launched at the host 106. The new key 112 can be generated locally using instrumentalities provided with the VM 102 (such as those in the initialization manager 110) or can be obtained from an external source, such as a key distribution service (KDS) 114.

In alternative embodiments, the VM 102 may be an unencrypted VM. In this case, a measurement (e.g. a hash) may have been created for the VM 102. The VM 102 can be deployed, to a host 106. The VM 102, in these embodiments, also includes an initialization manager 110. The initialization manager 110 can be executed. The initialization manager 110 can then encrypt the VHD 108 of the VM 102 with an appropriate, and in some cases, unique, key 112. In some embodiments, the host 106 will verify the VM 102 by computing a hash of the VM 102 to determine if the hash of the VM 102 matches the previously calculated and provided hash to ensure that the VM 102 has not been tampered with or corrupted.

The same principles and requirements for machine protection exist for both virtual and physical machines and many of the same architectural principles are applicable. Machines for which sensitive data are encrypted are referred to herein as protected machines.

Protected machines are those for which the sensitive data have been encrypted, and remain encrypted at rest and during transfer. The data for a protected machine are decrypted within a trust boundary of a protection system. Depending upon the type of machine (i.e. virtual or physical) as well as the implementation, that boundary may be only the protected machine itself or it may include additional services such as those belonging to the hypervisor or host operating system of a virtual machine.

A protected machine is described as existing in one of two states, either provisioning or operating. A protected machine is in a provisioning state while it is interacting with external services, receiving protected data or performing processes that are required to make it operational. Once a protected machine has been successfully provisioned it enters the operating state in which it provides the expected capabilities and services.

In many cases the provisioning operations which characterize the provisioning state occur only one time during the initial machine setup. Examples of these types of operations would be changes to machine name, address or identity required to establish a unique computer instance. While this is often the case it is not necessarily always so. For example, if some piece of data is required by a protected machine at start-up or some regular interval the machine may need to be repeatedly provisioned.

The provisioning architecture for protected machines is described herein. Embodiments can support various implementations that support both physical machines and virtual machines. In addition, a range of operational technologies may vary across implementations. These include the presence or absence of Trusted Platform Module (TPM) chips, as well as their versions, firmware types as well as hypervisor capabilities underlying virtual machines.

Various protected machine operating technologies which can vary between implementations may be implemented. For example, some implementations may require specialized hardware such as TPM chips or Hardware Security Modules (HSM) while others do not. Different implementations may require varying levels of trust in system services as well as system operators and administrators.

The description herein is organized into two major sections. In the first section a high-level architecture for protected machines is presented. In the second section detailed embodiments are illustrated.

Section 1: High-Level Architecture

Protected Machines

The architecture used to provision protected machines is described herein. One example of a protected machine is one which has its disk volumes encrypted using some full volume encryption software. For example, embodiments may use BitLocker available from Microsoft Corporation of Redmond, Wash. A protected machine operates within an environment which provides a compatible set of trust measures.

In many cases a protected machine will rely upon a virtual TPM specific to a guest virtual machine and/or a physical TPM for a host system on which a virtual machine is deployed to ensure protection of keys and to tie that protection to a specific system state. Use of a TPM may be desirable in many situations, however it is not strictly necessary. An environment that does not support measurement may be trusted by users in the same way and may be at least as trustworthy as one using physical TPMs if that environment is implemented and operated appropriately.

Trust Models and Boundaries

Each protected ma is created and operated in such a way that its integrity can be trusted. This implies that the environment hosting the machine can only interact with the protected machine through well-defined channels. All areas where the environment can compromise a protected machine are trusted and the collection of these represents the trust model for a protected machine.

Each environment may have a slightly different trust model and, indeed, different types of protected machines in the same environment may have different trust models. Throughout the architecture discussion components are divided into those that are trusted and those that are not. Components that are trusted are said to be within the trust boundary of the protected machine.

Architecture

This section describes a high-level conceptual component architecture used to provision a protected machine. This architecture may be realized using a variety of components, in different combinations. Later sections will describe specific implementation architectures that realize this pattern.

Figure 2:
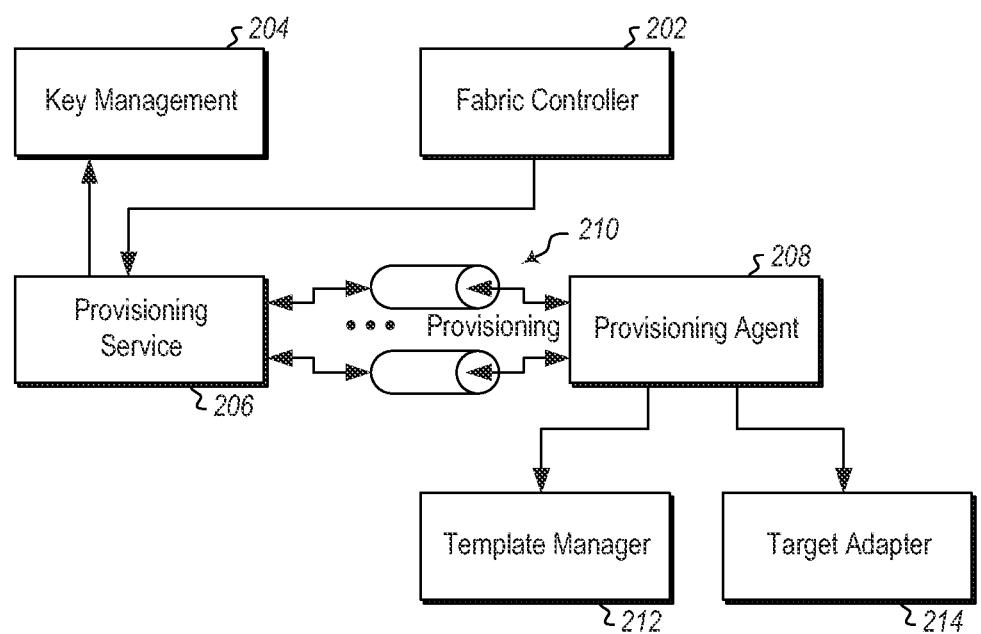
FIG. 2 illustrates a high-level component architecture.

The high-level component architecture is depicted in FIG. 2. Provisioning protected machines, in the illustrated example, takes place within a compute fabric that includes fabric controller 202. The fabric controller 202 dictates what events occur as well as when hose events occur.

Fabrics that support protected machines have some service or component that can reliably and securely store the secrets that are worth protecting. For the purposes of this description the service is assumed to manage keys that are used to access protected data. In some implementations this service may store the entire contents of the protected data. In the conceptual architecture this is shown as the key management service 204. The KDS 114 illustrated in FIG. 1 is an example of a key management service.

A provisioning service 206 is responsible for dispensing data that is used to provision a specific protected machine. The data that are dispensed may include both protected and non-protected data. The provisioning service 206 may provide its services to support many protected machines at the same time. For each protected machine, the provisioning service 206 interacts with a component called the provisioning agent 208. An instance of the provisioning agent 208 exists on a per-protected machine basis.

The provisioning service 206 and provisioning agent 208 communicate via one or more provisioning channels 210. A provisioning channel is simply a means of communication. These channels 210 need not provide privacy, integrity or reliability. In the illustrated example, the channels 210 are assumed to be unsecure. A channel could encompass such diverse mechanisms as networks, shared memory, serial ports or disk files. Due to the low quality of service required of these channels, the provisioning service 206 and the provisioning agent 208 can add privacy, integrity and reliability, as needed.

A provisioning agent 208 may perform all of the tasks required by the protected machine, however there are specific scenarios which may require additional, specialized capabilities. An especially important set of capabilities involves the process of using a generic template machine image as the basis for multiple protected machines. To accommodate this, some embodiments may include two additional components which may optionally be present.

The first of the template components is called the template manager 212. The template manager 212 is responsible for performing all operations on the disk image that are required to convert the template disk(s) into specific target disk(s) for the protected machine. For example, if the template disk were encrypted and signed, the template manager 212 would receive one or more keys from the provisioning agent 208 and would then verify the signature and update the encryption as needed.

Once the template manager 212 has completed the tasks required to create machine-specific disk images, the protected machine may be capable of running, however it is more likely that there is operating system or application-specific customization that is still required. A final component, called the target image adapter 214, is able to receive protected data from the provisioning agent 208 and use these data to perform customizations of the protected machine disk images.

Protected machines will generally have one or more encrypted volumes. These volumes may be encrypted, for example, using BitLocker available from Microsoft Corporation of Redmond, Wash. The volume containing the OS will be encrypted. For the OS to boot, that volume is unlocked using some appropriate key. Within the protected machine there may be additional encrypted volumes and these may be unlocked using keys that are stored within the OS volume. A protected machine may also contain volumes that are not encrypted.

Once created, a protected machine is operated over its lifetime. Operation of a protected machine may require that certain secrets be managed for, and introduced to, that machine at the correct time. These operations are considered to be recurring provisioning tasks and it is assumed that the correct architectural components will accomplish these tasks.

Key Management and Distribution

Secret data that exists within protected machines or to provision those machines may take a variety of sizes and types. In some cases these data may simply be a small item like a password where in others it may be a large complex structure such as an encrypted volume within a virtual disk.

To accomplish the protection goals the architecture will refer to just the protection of data, not the protected data itself. Protected data often has the following characteristics:

It is Authenticated—Protected data may be authenticated in some way such that any alteration of those data can be detected.

It is Encrypted—Protected data may also be sensitive and be encrypted to prevent unauthorized disclosure.

The keys used to authenticate and encrypt data items will be managed through some key management service 204. An entity, such as a fabric service, that requires access to a protected data item will request the appropriate keys from the key management service 204. It is the responsibility of the key management service 204 to only release such keys under trustworthy circumstances.

Fabric Controller

Protected machines are managed within a group of systems with management software that is responsible for all aspects of system operation outside of the machines themselves. The collection of such machines is generally referred to here as a fabric and the software systems that control the fabric are referred to as the fabric controller 202.

Fabric management may be broken into a number of components. Some of these components will be services that operate across managed machines while others may be specific to an individual machine, such as an agent operating on a single host.

Provisioning Service

The fabric maintains a service that can orchestrate the provisioning process as well as provide secrets to a machine throughout its lifetime. This service is called the provisioning service 206, and it is part of an overall fabric which would be owned and operated by a hoster. The provisioning service 206 obtains protected provisioning data 116 and communicates those data to another component, called the provisioning agent 208, for the target OS instance.

The provisioning service 206 is expected to have access to protected provisioning data 116 for one or more protected machines. It is the responsibility of the provisioning service 206 to maintain the correct separation between data belonging to multiple machines since it is within the trust boundary of each such machine that it serves.

Where required—for example due to communications restrictions—the provisioning service 206 may be split into trusted and non-trusted portions. When this is done, the non-trusted portion does not have access to the clear text of protected data and is not able to cause those data to be released to an incorrect target.

Provisioning Agent

The provisioning agent 208 is a specific component that runs within the trust boundary and is responsible for orchestrating provisioning operations. The provisioning agent 208 may run at any time provisioning is required. Some examples might include:

One time, during initial boot, to obtain unique, private data needed by the target OS instance to operate.

On each boot. For example, to obtain credentials or keys that cannot be stored securely within the OS instance itself.

The provisioning agent 208 interacts with the provisioning service 206 using protocols and data exchange methods that are defined by that pair of components. The provisioning agent 208 exists within the protected machine's trust boundary and will generally have access to sensitive information that is communicated from the provisioning service 206. If it is required, for instance due to details of the communication with the provisioning service 206, the provisioning agent 208 may be split into both trusted and untrusted components. If this is done, the untrusted components exist outside of the protected machine's trust boundary and do not have protected data exposed to them. It is generally expected that a given provisioning agent 208 instance will only interact with a single provisioning service 206.

Once the provisioning agent 208 has completed operations, the target protected machine (e.g. VM 102 in FIG. 1) is capable of booting. It ay be the case that the target s able to directly boot, or the target may need to reboot but it is the provisioning agent 208's responsibility to exit with either a failure or a bootable protected machine. The provisioning agent 208 may run on every protected machine startup. This may be the case if, for example, some level of provisioning is needed every time the system starts. A specific example might be a disk encryption key that is delivered to the system every time it starts.

Provisioning Channel

The provisioning service 206 and the provisioning agent 208 communicate with one another. In some implementations these may actually be portions of the same program and the communication may be in the form of internal data structures. In other cases the two components may run in different processes or even on different machines. The exact implementation of these components will dictate the requirements for one or more channels that allow them to communicate.

When the provisioning channel has no specific capabilities beyond communication—and unreliable communication at that a variety of different channels may exist. Some possible examples include:

In memory data structures between components of the same executuble.
Network based transports between hosts.
Specialized transports between a virtual machine and a service running in the root of the same host.

Template Manager

One of the inherent challenges involved in the protected machine lifecycle is simply creating the protected machine. In some cases a protected machine will be created under tightly controlled conditions by a trusted administrator. In such cases there is a high degree of assurance that hardware, environment and source media for installations is trustworthy. In most cases, however, the creation of a new protected machine happens from an existing template (e.g. template 104 in FIG. 1). The template contains a generalized copy of a running system. To create a new protected machine, a copy is made of the generalized system and then this copy is specialized to create a unique target instance (e.g. the VM 102).

Within the provisioning process it is the task of the template manager 212 to convert a machine template to a unique target. The source disks (e.g. VHD 108) within a template may be encrypted or they may have some form of integrity validation. The template manager 212 runs within the trust boundary to verify the source template and enforce any necessary encryption.

The template manager 212 is invoked, from the provisioning agent 208 and it is expected that the template manager 212 is invoked at most one time in the lifecycle of a protected machine. The provisioning service 206 should have adequate controls to determine when it invokes the template manager 212.

Target Image Adapter

Once the template manager 212 has created a unique target protected machine image, the image itself may need alteration to allow it to operate. For example, a generalized operating system image will require some group of settings that will allow it to operate as a unique operating system image. In Windows, available from Microsoft Corporation of Redmond, Wash., this is a process known as specialization. The target image adapter 214 is responsible for injecting instance-specific data into the protected machine image.

Once the provisioning agent 208 has verified that the template manager 212 has successfully run, it concludes that the target disk volumes have the requisite level of security to allow persistence of sensitive machine-specific data within them. The provisioning agent 208 then executes the target image adapter 214 which is responsible for these "fix-up" types of operations.

The target image adapter 214 runs within the trust boundary of the protected machine, handling sensitive data such as private keys and administrative credentials. The adapter functionality is dependent upon the target OS type and the nature of the configuration that needs to take place. For example, data may be written to the target OS volume to permit specialization. The target image adapter 214 may be split into multiple parts if, for example, those parts need to run at different points in the machine's boot cycle. In this case it is assumed that all portions of the target image adapter 214 run within the protected machine's trust boundary.

Section 2—Provisioning Protected Virtual Machines

Embodiments may include a collection of services and components that will enable the creation, migration and operation of protected physical or virtual machines.

Embodiments may be implemented where neither the fabric manager 254 (i.e. SC-VMM) nor a local virtualization hypervisor 215 host administrator should be able to compromise the protection of a virtual machine or access any of that machine's secret data.

Protected virtual machines may rely on one or more technologies and features of the operating system to operate securely.

Foundation Components

A number of the components that can be used to construct the overall protected VM scenario in embodiments implemented using Hyper-V available from Microsoft Corporation of Redmond, Wash. are as follows:

Virtual Secure Mode (VSM)—A Hyper-V (or other hypervisor) enforced memory isolation model used to protect high value data.
Hyper-V Code Integrity (HVCI)—Policies enforced by Hyper-V (or other hypervisors) that control what code may be executed in kernel mode of the root partition.
Trusted Platform Module (TPM)—An isolated security module, implemented in hardware or firmware, which can be used to measure platform state and protect secrets.
Remote Attestation—A process of using a TPM to report on the state of a platform in a cryptographically authenticated manner and then of determining the state or health of some part of that platform.
Health Certificate—A certificate issued to a host when it is known, by some measure acceptable to the fabric, to be healthy,
Key Distribution Service (KDS)—A service that will release keys to a platform if the platform can prove its health.

Solution Walkthrough

Figure 3:
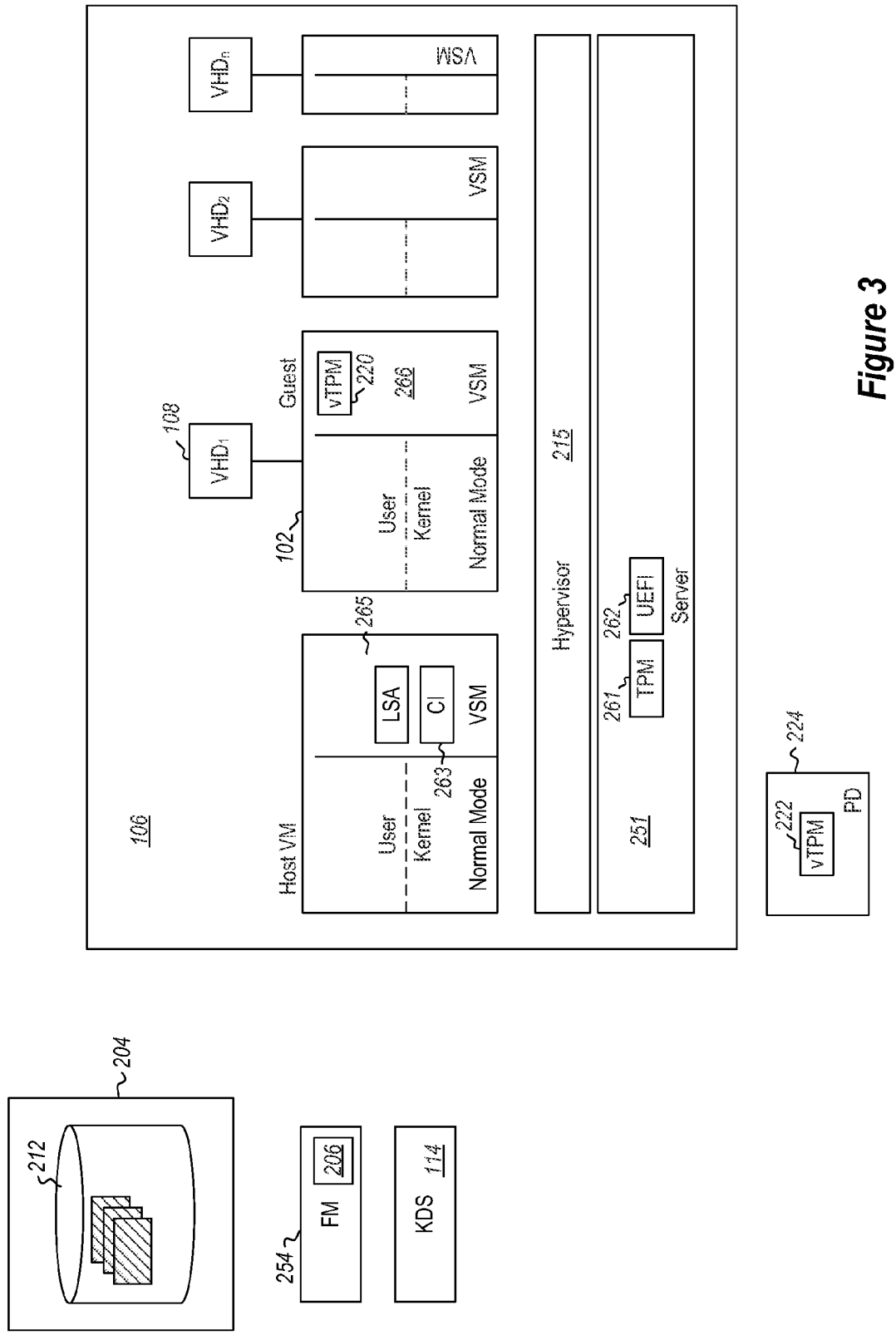
FIG. 3 illustrates a detailed example of a system performing a rekeying operation.

A detailed example is now illustrated in FIG. 3. A fundamental unit of protection for an example VM 102 (or in some embodiments, a physical machine) may be an encrypted disk volume, such as a VHD 108. Protected data are placed on a volume within a virtual disk (VHDX) and that volume is encrypted using Full Volume Encryption (FVE). A given virtual machine may have any set of its virtual disk volumes encrypted in this manner. A protected VM 102 has its Operating System (OS) volume encrypted with FVE. FVE imposes the requirement that the boot volume for the VM's OS be unencrypted, however the contents of this volume will be integrity-verified.

A FVE-protected volume may be configured for unlock using a number of different key types. Some keys require a user to be present to enter a password or PIN. Other types of keys may require a key that is stored within, or derived from, protected data on another volume. Still other types of keys may be read from an external device such as a USB thumb drive. Some of these keys are appropriate for server usage when the encrypted volume represents a data volume. For example, a key that is derived, from a store in a running OS is sufficient to unlock a data volume for a machine.

The above keys are typically not suitable to unlock an OS volume and, even more so, an OS volume in a hosted cloud environment. The reason is that all of the keys either require a running OS already—something not possible when the locked volume is the OS volume or they require user input. FVE also supports the use of a Trusted Platform Module, or TPM 261 running in hardware 251, to protect OS volume unlock keys allowing the OS volume to be sealed to a specific computer system and to be unlocked automatically during boot.

In some embodiments, a VM 102 may have a virtual TPM (vTPM) 220 as part of its virtual hardware. This allows a TPM-based FVE protector to be used on the OS volume of a VM 102. In some respects, the incorporation of a virtual TPM, or vTPM, to protect a FVE volume simply moves the protection problem. Now, rather than protecting the FVE key it becomes necessary to protect the private, shielded data of the vTPM from disclosure and tampering. Virtual hardware for VMs can be implemented within the root partition. This has traditionally meant that an administrator of the machine's root partition can access the virtual hardware and disclose or change data stored within it. However, this situation would be incompatible with the goal of preventing a local administrator from compromising a protected VM.

Some embodiments implement Virtual Secure Mode, or VSM 266. Briefly, VSM uses hardware memory mappings to create different trust levels, called Virtual Trust Levels or simply VTLs, within a single partition. Code within a partition may enter or exit a VTL using a specific virtualization hypervisor 215 call. Entering or exiting a VTL will cause the virtualization hypervisor 15 to change the memory mapping that is accessible to code running within the partition.

VSM creates a new capability whereby code running in, say, the root partition is unable to access certain protected data. This applies even to code that is running in kernel mode which currently has no restrictions placed upon it. Only a very small amount of code will be allowed to execute at an elevated VTL. This trusted code—often now just referred to as "VSM code"—may be controlled such that third parties will not be able to extend it.

In some embodiments, the new vTPM 220 hardware is implemented in VSM 266 code. This means that the data that comprises the secret, shielded portions of the vTPM 220 are inaccessible to most of the root partition code, even if that code runs with administrative privileges and even if that code runs in kernel mode. The VSM 266 code is considered to be within the trust boundary that manages protected VMs.

While VSM 266 can provide a significantly improved boundary for management of trusted code and data, it is not impervious to attack. One way to prevent attacks is to impose Code Integrity, or CI, controls on the system. CI controls use specific policies, called CI policies, to determine what code is allowed to execute on the system. Still, the CI policies, which exist in the system's root partition, are vulnerable to attack. Embodiments may implement a security feature that enables CI Policy enforcement for kernel mode root partition components to be done from the hypervisor 215 itself. This feature thwarts runtime alteration of CI policies and in solutions available from Microsoft Corporation of Redmond, Wash., is called Hyper-V Code Integrity, or HVCI. An example is illustrated at CI 263.

While CI policy may be well protected during system runtime, it is still vulnerable to offline attack. If a system is shut down, then an attacker with access to the machine's storage may be able to alter the policies that control CI 263, as well as other policies, and then restart the machine in a compromised state. This would then permit subsequent online attacks. To mitigate this type of attack, embodiments may also implement additional hardware-bound measurements of machine health that allow detection of a compromised host prior to having protected data deployed to it. These measurements use the machine's physical TPM 261 in the process of remote attestation.

The features above describe a means to implement a significant defense-in-depth strategy and a minimization of the trust boundary required to provision and operate a protected VM. Not every one of these features is technically required for protected VM functionality to exist.

Trust Boundary for Protected VMs

The owner of a protected VM 102 explicitly trusts only the Key Distribution Service (KDS) 114 of a fabric that will operate, and possibly create, the VM 102. The owner expresses this trust explicitly by making the KDS 114 a guardian of secrets required to create and/or operate the VM 102. Within a fabric a KDS 114 has the ability to dispense keys under conditions that adhere to fabric policies.

For a protected VM 102 to be created or operated, one or more secrets are available at the host 106. These secrets include the vTPM 220 as well as, possibly, volume encryption keys or other data needed to create a new VM from a template 104. Protected data are delivered to a host 106 and are decrypted within that host's VSM 265. Code within VSM 265 on the host 106 requests keys from the KDS 114 and those keys are delivered if the KDS 114 deems the host 106 to be healthy. Code within VSM 265 of an attested fabric host is considered to be within the trust boundary for protected VMs running on that host 106.

A protected VM 102 is also part of the trust boundary for itself. That is, code within the protected VM 102 has access to the protected data that constitutes the protected VM 102. The implication of this is that protected data which have been accessed within VSM 265 of the host 106 can then be exposed within the protected VM 102 to which those data belong. However, Not all data that pertains to a VM that is in VSM can be exposed within the VM. For example, the shielded locations of the vTPM are not exposed, just as those of a pTPM would not be on a physical machine.

It is possible for some protected data to be exposed directly from VSM 266 to the protected VM 102 if there is an appropriate abstraction such as a virtualization mechanism to support it. The vTPM 220 is an example of this type of data where the vTPM contents are operated upon within VSM 266 allowing a functional vTPM to be exposed into the VM 102. The VM 102 never has direct access to the vTPM 220 contents, such as shielded data. This model directly parallels a physical TPM on a physical machine.

In other cases the protected data that are available for a protected VM 102 in the host's VSM 265 have no virtual hardware equivalent. In these cases the data is securely transported into the VM 102 to be of use. Most provisioning data 116 fall into this category. In these cases the data are protected between the host's VSM 265 and the target protected VM 102 such that they cannot be disclosed, modified in an undetectable way or in any other manner compromise the integrity and privacy guarantees made by the solution.

From an architectural perspective, in some embodiments, the KDS 114, part of the provisioning service 206, the provisioning agent 208, the template manager 212 and the target adapter 214 (see FIG. 1) are all within the trust boundary for a protected VM 102.

Protected Data

Creation and operation of protected VMs uses protected data. Protected data are some data item(s) that are encrypted and authenticated and which are decrypted within the formal trust boundary of the solution. In some embodiments, each discrete piece of protected data has a unique data structure that describes the current protection state. This structure is called a protection descriptor, or PD. Each piece of protected data is a stream of, in some embodiments, octets that has no intrinsic meaning. Various components and processes package protected data for their use.

Protected VMs may rely on one piece of protected data over their operational lifetime, that being the vTPM 220. The vTPM 220 is used, in turn, to safeguard the encryption keys for the VM's FVEed OS volume. The vTPM 220 is part of the operational state of each protected VM and, as such, it is carried in the VM's definition (e.g. a .vmcx file in the case of virtual machine implementations provided by Microsoft Corporation of Redmond, Wash.).

If a new protected VM 102 is created by its owner in a trusted environment it may never require any protected data beyond the vTPM 220. In this case the protected VM 102 is created as an empty VM on a computer running a virtualization hypervisor 215. The new VM 102 has a vTPM 220 associated with it and the owner installs new software into the VM 102 in a secured and trusted environment. The environment is secured and trusted since the installation process is not itself secure.

However in many cases a new protected VM 102 is created by starting with a template 104 and specializing the template 104 to form a distinct protected target VM 102. First, a new template OS is laid down on the OS disk. The template OS is in a generalized form and it is later specialized, to produce a distinct OS instance. The process of deployment and specialization requires some set of provisioning data 116 (see FIG. 1) which are used to differentiate the new instance. These provisioning data 116 typically include things like computer name and administrator password.

When creating a new VM from a template some additional protected data are needed. These protected data contain sensitive information such as initial encryption keys (to be described later) as well as administrator password or other specialization data. In some embodiments, the provisioning data are used only once per protected VM, and only at creation time.

Protected Virtual Machine Template-Based Provisioning Capabilities

Creating a new, distinct VM 102 from a template OS disk is performed in a sequence of steps. The set of steps may vary based upon the exact scenario but it generally can include the following:

1. Decrypt the template OS volume—The OS volume may have an external key that is required to unlock it. If so, the key is passed into the factory and is used to unlock the source volume.

2. Re-encrypt the OS volume—In most situations the template OS volume either has no encryption key or an encryption key that would be identical across all disks derived from the same template. It may be necessary to re-encrypt the volume.

3. Authenticate the OS volume—Some OS volumes are accompanied by signature information. The signature is verified to ensure the template has not been altered.

4. Match provisioning data to the template—An owner may have different provisioning data intended for use with different template operations. The provisioning data are matched to the template.

5. Inject provisioning data—Once the target OS volume is verified and secure, provisioning data may be injected into it. These data are passed into the factory.

Template Disk Types

There are two distinct template-based provisioning scenarios that are now described. Both of these result in a protected VM 102 which has one or more FVE-encrypted volumes. In addition, both scenarios require some set of protected provisioning data 116. The difference between the scenarios lies in the source and protection of the template virtual disk(s). Two disk scenarios are:

1) Encrypted Template—The virtual OS disk contains an OS volume which is encrypted using a secret FVE key. The secret FVE key is protected data.

2) Signed Template—The virtual OS disk contains an OS volume that is encrypted, however FVE is suspended meaning that no secret key is required to access the volume. The boot partition contains a signature catalog over the OS volume to permit integrity checking.

In both cases the VM factory operations that are preformed are on the OS volume of the boot disk. The VM 102 may contain additional encrypted volumes and, if it does, any auto-unlock is set in the OS volume of the template disk. In some embodiments, the VM factory does not perform re-encrypting operations on data volumes.

Encrypted templates are intended to be used privately by a single owner or tenant and may contain that tenant's private data. The VM factory protects these data from disclosure. Signed templates are intended to be published and not to contain sensitive data. A signed template may be authenticated using a signature catalog but the data contained, in it should be assumed to be freely disclosed. Signed templates are useful starting points for generic workloads. Thus, for example, encrypted templates may be provided directly by the tenant, while signed templates are available generally in a template gallery to any tenant.

Template Virtual Hard Disk Creation

To enable creation of protected VMs from templates, one or more template virtual hard disks are first created. A template virtual hard disk is created in a secure environment. This is done because the creation process likely relies on operations that manage data that is not afforded protections within the prescribed trust boundary for a protected VM.

In most cases a template virtual hard disk is created by a tenant needing a private, encrypted template or by a hoster or vendor that wishes to publish a standard template. These template disks may be created on stand-alone secured machines.

OS Disk Creation

Each protected VM boots from an encrypted OS volume on the virtual boot disk. To create a new OS template disk the process begins with a new, non-protected VM. This new VM, called the templating VM, exists specifically to create a new template OS disk. The templating VM does not need to have a vTPM.

The templating VM initially has a blank boot disk. Once the new boot disk is created, a new copy of the operating system is installed. This can be a commercially available edition that supports FVE. For example, some embodiments may use Windows 8 or later available from Microsoft Corporation of Redmond, Wash. The OS disk next has FVE driver encryption enabled. The drive encryption may be performed with the following parameters:

1) Encryption may be set to encrypt used space only. Most virtual OS disks are multi drive, fault tolerant (e.g. by having redundancies) disks and this option is both much faster and results in a smaller virtual disk file.

2) Save the key to a file. The FVE key, which is protected by the Transport Key or TK, may be saved to a file. To facilitate this, an additional virtual disk may be attached to the VM or the key may temporarily be saved to the OS disk itself.

Once FVE has completed encrypting the OS volume, the key is stored in a secure location. The key is contained in a file at the location specified in (2) above. Once the key has been saved to a secure location, it is erased from the original location.

For signed templates, if the template creation process is being used to author a signed template then FVE is now suspended on the OS volume. Suspending FVE allows access to the OS volume without the key created above. The above key should not be required subsequent to suspending FVE.

Once the OS and any additional software is installed, and all configuration has been completed, the OS should be generalized. In some embodiments, this may be accomplished using the Windows sysprep utility available from Microsoft Corporation of Redmond, Wash. When the generalization is complete, the target OS may be configured to prevent setup specialization and customization from running when it is next booted. The templating VM should now be shut down.

Template Signature Catalog Creation

Template disks are signed irrespective of whether the final product is an encrypted template or merely a signed template. The rationale for this is that encryption alone cannot be used to detect tampering. While it is considered extremely unlikely that an adversary could tamper with a FVE encrypted disk in a way that might introduce a security vulnerability, it is possible that data could be destroyed causing the resulting VMs to operate incorrectly.

The OS virtual disk file from the templating VM which contains the new template image is mounted on a secure authoring workstation. This may be the same workstation on which the templating VM was earlier created but that is not required. The workstation on which the OS disk file is mounted has the template signing certificate installed.

Once the OS virtual disk is mounted, there are two partitions present on it. The first is the unencrypted boot partition which contains the boot files. The second is the OS volume itself which has been encrypted with FVE. FVE may or may not have been suspended, but if FVE is active, the volume is not unlocked. The OS volume is taken offline so that the current OS has no file system mounted over it.

The author can use a special signature catalog creation tool to generate a signature catalog for the OS volume. The resulting signature catalog is a file that is written to the boot partition of the disk. The tool allows for user input for the Volume ID and version, as described below.

The OS Volume Catalog file fields are as follows:

Hash—A cryptographic hash over all used blocks of the disk. The hash, in some embodiments, does not cover blocks that are unused by the current file system. The hash contains both the algorithm ID and hash value.

Volume ID—A structure assigned by the publisher that allows the publisher to name and version the volume. The Volume ID contains the following parts:

Name—A textual name assigned to the volume. This name can be anything of the publisher's choosing.

Version Number—In some embodiments, this may be a four part version number of the form w.x.y.z.

Publisher Certificate—The certificate containing the public key which corresponds to the signing key used by the publisher. The signature checking may use just the key or, if it is able, use the entire certificate to determine whether the signature is valid.

Signature—The signature over all fields in the catalog.

The location of the catalog should have a default but should also be able to be specified via boot configuration data (BCD) setting.

Encrypted Template Publication

When an encrypted template is being published, the corresponding key file is maintained and is available when new provisioning data that references the template is to be created. The key file is kept in a secure location, such as an encrypted external drive, and only available when provisioning data creation requires it.

Data Disk Creation

A protected VM may have one or more data disks in addition to the protected OS disk. The data disks, if they exist, may be clear or encrypted as required. If an encrypted data disk is required, it may be created, in some embodiments, prior to creation of the template OS disk. The OS on the template OS disk is configured to automatically unlock the FVE-encrypted data disk.

Provisioning Data Creation

When a new protected VM 102 is to be created from a template 104, a special file called a Provisioning Data Keyfile (PDK) may be used. A Keyfile is simply a structured group of elements where each element contains its own descriptive header. The PDK provides a sort of recipe for the template-based creation including the requisite keys and allowed volume IDs. The granularity of a PDK is determined by the tenant that is creating new protected VMs. Some examples include:

A tenant could choose to have one PDK that is used to create all protected VMs.

A tenant could create a different PDK for different classes of machines based upon their content or use.

A tenant could choose to have a different PDK for every single protected VM to ensure specific settings for each one.

Provisioning data 116 be rendered into a Keyfile structure. The overall Keyfile can then be protected as private data.

In some embodiments. The PDK contains at least three items that are used in the provisioning process, these are:

1) Volume ID Qualifiers—A set of qualifiers that describe information from corresponding OS volume catalogs. A specific PDK can be used with a template OS disk if the PDK contains a Volume ID qualifier that can match the OS Volume ID, as described later.

2) Factory Data—Settings that guide the secure VM factory operation.

3) Customization Data Section—A group of data items and descriptions that are used to customize the OS from a template disk.

OS Volume ID Qualifiers

Each catalog, in the illustrated embodiment, contains a textual name for the OS volume and a version number, both of which are determined by the template's creator, or publisher. The overall catalog is signed. The catalog contains the signer's certificate which, in turn, contains the public signing key.

An OS Volume Qualifier, or simply a qualifier, is basically a rule that is used to match one or more catalogs. Each qualifier, in some embodiments, contains the following items:

Name—A name that is used to match the name in a catalog. The name in a qualifier may contain the wildcard characters, such as "*" and "?" with the same matching rules as a command prompt.

Version—In some embodiments, a multipart version number. Each part of the version is optional as is the overall version. If the version is omitted then the empty version matches all versions from catalogs. If any part of the version is missing, that part is interpreted as being 0.

Version Rule—May be Greater-Than, Greater-Than-Equal, Less-Than, Less-Than-Equal, Equal or Not-Equal. This is the rule used to match the version in the qualifier with the version in the catalog.

Signing Key—The public key that is expected to be used to sign the volume catalog. The signing key may be omitted to create a qualifier that allows all catalogs, though this significantly relaxes security.

Volume Key—Optional, and not present in signed-only templates, contains the FVE encryption key needed to unlock the volume.

The qualifiers section of the PDK contains one or more individual OS volume qualifier entries. Each entry can describe a range of target OS volume catalogs. The simplest qualifier contains a wildcard name, no version, an Equal-To version rule, no signing key and no volume key. The resulting PDK could be used with all signed-only templates.

Factory Data

Factory data describe how the factory is to process a template disk. Factory data are OS dependent. In some embodiments, the following values are specified:

FVEK Re-encrypt—Applies to encrypted template disks only, ignored if the template disk is signed-only. The option specifies to "Not Re-Encrypt" It is ignore for non-encrypted (i.e. signed-only) templates because in those cases the keys are well known such that embodiments always roll the FVEK. When this option is specified, the Full-Volume Encryption Key (FVEK) is rolled for each template copy. Applying this option significantly increases the processing time of the VM Factory. Applying this option also prevents scenarios where a single parent disk is used by multiple differencing disks.

Ignore Signature Checks—Causes the signature checking to be ignored. In signed-only template disks no signature is even calculated which saves time. This option may be specified to relax signature checking and also to speed creation, especially for signed-only templates. Some embodiments may be configured to never honor this option except on encrypted templates.

Customization Data

Each PDK may contain a specialization data section. The specialization data section is the mechanism employed by tenants to pass private data and instructions to the protected factory processes. The specialization data are intended to describe the way that the templating-to-target process happens.

Some of the specialization data may be consumed within the protected VM factory while other portions may be consumed within the target OS. Specifically, factory data are consumed by the factory processes while specialization data are passed to the OS in an OS-dependent fashion.

Specialization Data

Specialization Data are consumed completely within either a specialization manager component of the VM factory or between the specialization manager and the target OS. The division of responsibilities depends upon the target OS and the mechanisms used to specialize it.

Given that the specialization data is OS-dependent, so is the format and content. For example, in Microsoft Windows there are two sections of data. Each entry in each section begins with a name. The name is based upon a name for the Windows unattend.xml answer file.

The first section is called the protected values section. This section contains a value corresponding to the name of each data item. The value is a composite of a data type and a compatible data value. This is the value that is passed to the target operating system for the specified entry in the unattend.xml answer file.

The second section is called the allowed fabric values section. This is a list of names only and it is interpreted as a "white list" of values. The specialization manager and any specialization code in the target OS allows non-secure sources for values that are specified in this section. In the case of the protected VM factory the fabric manager 254 is allowed to pass in template values. Those template values are in the PDK's allowed values list to be applied.

Provisioning Operations

As described earlier, provisioning operations may be separated into the one-time operations that are required to create a protected VM and the recurring operations that are required to operate that VM. Some embodiments may be implemented in an environment that has a rich template-based provisioning capability but requires no recurring operations.

The provisioning process is implemented in the secure VM factory. The secure VM factory runs completely within the target protected VM providing a scalable, secure solution. Each protected VM starts in the unprovisioned state, an individual protected target OS is created within that protected VM using the processes described in the next several sections.

Initial Unprovisioned VM State

The fabric manager 254 orchestrates creation of a new protected VM 102. When the new protected VM 102 is first created, it is in an unprovisioned state. In the initial state the VM is not usable and may not even boot. In addition, the protected. VM state, comprised, of the vTPM, cannot be migrated out of the current running virtualization hypervisor 215 instance because it has no protection associated with it; the only protection afforded the new vTPM 220 is that it exists entirely within VSM 266.

Detailed Steps of Protected VM Creation

When a new protected VM is created, a sequence of steps is performed to place it in an initial unprovisioned state.

Copy Template Disk

To start protected VM creation, the fabric manager 254 creates new disks that form the basis of the new VM. The new disks may be, for example, any of the following:

1) A copy of a template disk. Any template disk may contain encrypted or signed volumes.

2) A new, empty disk. Any of the disks for the new VM may be empty disks. The OS disk may only be an empty disk when the owner is creating a new protected VM in a secure environment.

3) A differencing disk. A new differencing disk may be created that references a parent. The parent may be shared in certain cases. The parent disk may be an encrypted disk but not a signed disk.

Restrictions on the use of differencing disks from encrypted templates are described in greater detail below.

Initial VM Creation

The fabric manager 254 selects a host 106 that is capable of hosting a protected VM 102. The fabric manager 254 causes the hypervisor 215 on that host 106 to create a new VM. The new VM has a new vTPM 220. The new VM 102 is configured with the previously created correct set of virtual disks. The remainder of the virtual hardware is specified by the fabric manager 254 and is not part of the secure, or protected, configuration of the VM 102.

When the new VM 102 is created, the virtualization hypervisor causes a new vTPM trustlet to be instantiated, to host that VM's vTPM 220 instance. This trustlet is a vTPM program that manages TPM functionality for a specific vTPM instance The creation of the new vTPM 220 creates durable artifacts in shielded locations such as TPM hierarchy seeds. At this point neither VM 102, nor the vTPM 220 are running.

When the virtualization hypervisor 215 creates the new vTPM 220 instance, that instance has no protection associated with it. For example, there may be no Transport Key (TK) and/or no enumeration of the protection schemes available for it. An enumeration of protection schemes may be implemented using what is referred to herein as a Protection Descriptor (PD). The object exists within VSM 266 but since there is no protection, in some embodiments, it does not ever leave VSM 266. This means it cannot be saved or migrated to another host.

Instantiation of Provisioning Data

The fabric manager 254 retrieves the provisioning data 116 (see FIG. 1) that corresponds to the new VM 102. Provisioning data 116 exists as a protected data object with a specific internal format as described previously. The provisioning data 116 is completely opaque to the fabric manager 254. The fabric manager 254 merely controls the storage and movement of this object.

On the same host 106 where the new VM 102 has been created, the fabric manager 254 instantiates a provisioning trustlet instance. This trustlet is a VSM program that manages the provisioning data 116 for the specific VM instance. The fabric manager 254 passes the provisioning data 116 to the new trustlet instance.

Establishment of vTPM Protection

Once the fabric manager 254 has retrieved the provisioning data 116, the fabric manager 254 extracts the PD from the PDK containing the provisioning data 116. The fabric manager 254 calls into the vTPM trustlet to set a PD enumerating compatible protection schemes on the vTPM 220. The vTPM 220 allows the protection to be set one time on the vTPM 220 from outside of VSM 266 because there is no current protection in place.

The vTPM trustlet attempts to set protection on the vTPM 220 based upon the PD that has been passed from the fabric manager 254, itself untrusted to VSM 265. To do this the vTPM trustlet contacts the correct KDS 114 passing in the existing PD. The KDS 114 responds to this request by unwrapping the existing TK from the PD as well as creating a new TK 112 for egress and a new PD to describe the new TK 112. These are returned to the vTPM trustlet. The unwrapped TK is not needed by the vTPM trustlet since it applies to the PDK. The new TK 112 and associated new PD are for the new vTPM 220. The vTPM trustlet can now export the vTPM 220 as needed from VSM 266 because it has sufficient protection for the data. It is important to note that the owner (one who owns datasets), guardians (entities that may host or store a dataset for the owner) and guardian in possession (an entity that protects datasets) on the new vTPM PD 224 match the PD on the provisioning data 116.

The process of creating new protection for the vTPM has the following properties:

The KDS 114 that acts as guardian in possession of the provisioning data 116 is the same as the one that acts as guardian in possession of the vTPM 220 by virtue of deriving one PD from the other.

While a well-formed PD to be set on the vTPM could be created by almost any entity that entity would be unable to sign as the correct guardian in possession.

When using a full KDS 114, protection on a new VSM object, in this case a vTPM 220, can only be set based upon protection from another object.

Virtual Machine Factory

As described earlier, a new protected VM can be created manually from an empty VM using distribution media for OS installation. However, as also stated, this is rarely the case and this is mostly a process reserved for special cases such as the creation of templates. Templates, in turn, are used to produce additional VMs in a more automated fashion.

The set of resources, processes and tools used to create a new VM is called a VM factory. A VM factory may produce VMs that are protected or not protected, depending upon the virtual hardware and the processes that are executed; some protected VMs require a vTPM and at least a FVE encrypted OS volume.

To create a protected VM, a process is executed has two inputs. These are:

1) Template Disks—One or more virtual hard drive files that contain template disks. The process makes copies of these template disks and then specialize the contents as needed.

2) Provisioning Data—Data values that are needed to make the new VM disks—initially copies of the templates—distinct instances belonging to the new VM.

The process of creating a protected VM includes injecting the specialization data into the new VM and then the new VM is booted. The initial boot causes a specialization phase of an OS setup to run which consumes the specialization data and results in a unique OS instance for the VM.

To finish the process of creating a protected VM the OS volume, and perhaps other volumes as desired, is FVE encrypted to ensure that they are protected at rest. Once this has been done, the protected VM may be instantiated anywhere that its vTPM can be decrypted.

A Secure VM Factory

The VM Factory as described above is usable in a trusted environment. That is, in an environment where the owner of the VM can trust the hardware and software used to perform the processes, the resulting protected VM can also be trusted. In a very common case a protected VM is created within a fabric that is owned and operated by some entity other than the owner of the new protected VM. When this is the case, the VM factory operates within the trust boundary described earlier. Alternately, that trust boundary could be relaxed for VM creation, but it is important to recognize that relaxing the trust boundary might compromise the integrity of the resulting protected VM.

For a secure VM factory, the inputs to the process may need to be protected. The description above describes creation of template disks and provisioning data 116, including the creation of protected instances of these.

Embodiments use the protected VM 102 itself as a host for the secure VM factory. To accomplish this, the protected VM 102 boots in a way that allows it to unlock and process the template OS disk as well as the provisioning data 116. The resulting target OS information is never exposed outside the protected VM 102 itself.

Secure VM Factory Processes

The process of creating an initial unprovisioned protected VM was described above. At the end of that process a protected VM and provisioning data 116 exist in the following state:

The protected VM 102 including the vTPM 220 have been created by the virtualization hypervisor 215 but have never been started.

Protected provisioning data in the form of a PDK has been downloaded to the host 106 and a provisioning trustlet has been instantiated to hold that data.

The provisioning trustlet instance has received a key for the PDK and has decrypted and authenticated the provisioning data which now exists in clear text within VSM 265.

The fabric manager 254 has used the PD from the PDK to set a new PD on the vTPM 220.

Normal Mode Provisioning Service

The fabric manager 254 now launches a new process called the Normal Mode Provisioning Service (NMPS) 206. The NMPS 206 is a simple service that serves as a communication bridge between components that take part in the secure provisioning process. The NAPS 206 itself is not trusted code any more than the fabric manager 254.

Upon creation the NMPS 206 receives a handle to the correct vTPM trustlet, a handle to the correct provisioning trustlet and the local endpoint identifier for the new protected VM 102. These allow the LAMPS 206 to facilitate all communication among these entities. The NMPS 206 uses the VM endpoint identifier to begin listening for a connection attempt from the new protected VM 102 itself. In some embodiments, none of the communication between the NMPS 206 and any of the other objects relies on a secure connection; all privacy and integrity are ensured by the objects themselves.

Initial Protected VM Boot

With the basic components in place, the fabric manager 254 can signal the virtualization hypervisor 215 to apply virtual power to cause the protected VM 102 to initiate its first boot. In the illustrated example, the protected VM hardware has Unified Extensible Firmware Interface (UEFI) 262 secure boot and TPM 261 measured boot enabled. The UEFI 262 variables that control secure boot—PK/KEK/db/dbx—are controlled by the virtualization hypervisor 215 and allows only authoritative signed boot code to execute. The UEFI first stage loader loads, measures and executes the boot manager.

During the first boot the Boot Configuration Data (BCD) is read by the boot manager. A BCD entry instructs the boot manager to execute the protected VM factory code path. The BCD settings reside on the unencrypted boot partition of the boot disk and are consequently open to tampering. If an attacker attempts to thwart the process by disabling the protected VM factory then the resulting VM provisioning would not take place and no information would be compromised.

Boot Environment Provisioning Agent

The launch of the protected VM factory code path starts the Boot Environment Provisioning Agent (BEPA). The BEPA runs within the protected VM in the boot environment. Generally, the BEPA is illustrated, above as provisioning agent 208. The BEPA code immediately attempts to contact the NMPS endpoint in the root partition. Any communications failure in the BEPA results in an overall failure of the protected VM factory and a non-functioning VM. Once the BEPA establishes communication with the NMPS 206, a series of messages is exchanged to support provisioning. The message exchange causes a series of steps to occur in the provisioning process.

PDK-Request Message

Immediately after connecting to the NMPS 206 the BEPA sends a PDK-Request message to ask for its provisioning data 116. The message includes a public endorsement key ($EK_{pub}$) of the vTPM 220. The BEPA reads the $EK_{pub}$ directly.

The NMPS 206 receives the PDK-Request message from the BEPA and forwards the message to the associated provisioning trustlet instance, in the illustrated example, there is exactly one provisioning trustlet associated with each NMPS instance. There is no encryption, authentication or validation of the PDK-Request message performed by the NMPS 206.

vTPM-Protection-Query Message

When a provisioning trustlet instance receives a PDK-Request it responds with a vTPM-Protection-Query message. This message is initially sent from the provisioning trustlet to the NMPS 206. The message simply contains the $EK_{pub}$ that was received from the PDK-Request. The NMPS 206 locates the vTPM trustlet instance corresponding to the $EK_{pub}$ and forwards the vTPM-Protection-Query message to that trustlet.

vTPM-Protection-Statement Message

When a vTPM trustlet receives a vTPM-Protection-Query message, the vTPM trustlet first determines whether it hosts a vTPM with the correct EK based upon the $EK_{pub}$ received. If the key does not match then an Endorsement Key Mismatch error message is created.

If the requested EK matches the vTPM trustlet instance EK then the trustlet retrieves the PD of the vTPM. This is written into the vTPM-Protection-Statement message.

The vTPM trustlet causes YSM to sign the vTPM-Protection-Statement message using the VSM private key. This allows the message to be authenticated as originating in the current VSM 265 at a later point. The message is returned to the provisioning trustlet via the NMPS 206.

Determining Protection Compatibility

After receiving a vTPM-Protection-Statement message the provisioning trustlet first causes VSM to authenticate and/or guarantee the message as also having originated in VSM. This could be done, for example, by encrypting/signing the message. In one example embodiment, this is accomplished by allowing the data to travel within VSM through the VSM kernel. If this is successful then the provisioning trustlet has the PDs for both the PDK and vTPM. To continue with the provisioning operation the PDs must be compatible.

In some embodiments there is only one notion of PD compatibility and that is equivalence of owner, guardians and guardian in possession, where equivalence means that entities have the same PD principals and roles. This model requires that the PD set on the vTPM initially be generated from the PD on the PDK so this check should succeed except in an error or attempted compromise. If the PD compatibility cannot be verified then the provisioning trustlet simply returns a failure message to the NAPS 206. The NMPS 206 would pass that failure message back to the BEPA.

Creation of Provisioning Machine Key

Once the protection on the provisioning data 116 and the target protected VM's vTPM are determined to be the same, the provisioning trustlet moves forward to provide the provisioning data 116 to the protected VM. To do this the provisioning data 116 is protected when it leaves the provisioning trustlet in VSM 266 until it is securely within the protected VM 102. The protection of the data during this transfer continues to be indirectly assured by VSM 266. To do this, a TPM key in the target VM's vTPM 220 is used to protect the data; the vTPM 220 is, in turn, protected by VSM 266.

The provisioning trustlet uses a remote command execution against the target VM's security device (e.g. a TPM) to send messages back to the BEPA. These messages are TPM pass-through messages which the BEPA delivers directly to its TPM. The TPM processes such a message and returns a response to the BEPA which returns that response to the provisioning trustlet, all by way of the NMPS 206. This arrangement allows the provisioning trustlet to directly use the target vTPM.

The provisioning trustlet establishes a salted authorization session with the target TPM. In this case the provisioning trustlet knows the $EK_{pub}$ of the target TPM and knows that this is a valid TPM based upon the statement received from the vTPM trustlet. The provisioning truslet uses the target TPM's EK as the salt encryptor for the new session knowing that only that target TPM could correctly use the resulting messages.

Once the authorization session is established the provisioning trustlet issues a command to the target TPM to create a wrapping key sealed to specific Platform Control Register (PCR) values. While what goes into which PCRs is largely a choice of the operating system, in one example embodiment, the following PCR contents are implemented:

PCR[7]—Contains known "magic number" hash of the correct virtualization hypervisor 215 boot components.

PCR[11]—Must contain a known value that corresponds to the trusted boot environment. The boot environment later caps this to restrict key usage.

The resulting key blob is returned to the provisioning trustlet. This key is referred to as the Provisioning Machine Key, it is used to protect provisioning data 116.

Protecting Provisioning Data for the Target VM

The provisioning trustlet now writes a new version of the PDK. The new PDK contains the same sections as the original PDK plus the following addition:

Fabric Data—The keyfile sections from the fabric keyfile are incorporated into the PDK.

When the new PDK is created the provisioning trustlet next establishes protection for it. This protection is rooted within VSM 266. The steps involve creating a VSM standard PD for the new object. The following steps occur:

1) A new TK is generated, using key derivation function, such as Password-Based Key Derivation Function 2 (PB-KDF2) authentication and encryption keys (TK-E and TK-A) are derived.

2) The PDK is encrypted using TK-E.

3) A hash based message authentication code for the PDK is generated using TK-A.

4) The VSM public key is used to create the owner wrapping within the PD.

5) The public portion of the Machine Key is used to create a guardian TK wrapping and added to the PD.

6) The PD is signed using the VSM private key, making VSM 265 of the current host the guardian in possession.

The resulting protected object is only usable on the current host 106 within VSM 265 or in the target protected VM in the BEPA. When the boot environment in the target VM exits it caps PCR[11] rendering the data unusable after that. While the new protected PDK is not persisted by the BEPA, it may be persisted as part of a save-restore operation or migrated by live migration. Note that any such operation that occurs before the final protected PDK is sent to the BEPA causes the provisioning process to fail. Provisioning process failure requires a restart of that process.

Final PDK Transfer

The provisioning trustlet next creates a message that contains the newly protected PDK along with the TPM key blob that contains the Machine Key. This message is returned to the NMPS 206 which satisfies the request described in the section titled "PDK-Request Message", above. The NMPS 206 returns this to the BEPA.

When the BEPA receives the PDK message it first establishes a new, local session with the TPM 261. Within that session the BEPA loads the Machine Key blob that was returned from the provisioning service with the PDK. This operation only succeeds within the correct TPM 261, in the correct state (because of PCR sealing). Once the Machine Key has been loaded the BEPA uses this key to unwrap the correct copy of the TK from the PDK's PD.

Having recovered the TK the BEPA locally runs the standard key derivation function and produces copies of TK-E and TK-A. It uses these keys to decrypt and authenticate the protected PDK data. Once the PDK has been recovered in clear text the Protected Template Manager 212, as defined, below, may be run to process the template boot disk.

Protected Template Manager

Once the BEPA has completed execution the resulting clear text PDK is present in the VM's memory only. The protected factory next launches the Protected Template Manager (PTM) module passing it the template data portion of the PDK. The PTM is used to process the template boot disk which includes checking signatures, changing keys and establishing new FVE protection.

Volume Qualifier Matching

The PTM first determines whether the template OS volume might be suitable for use with the currently available provisioning data 116. This process begins by reading an OS volume catalog file from the boot partition of the boot disk. If the catalog is missing, the operation is marked as a volume qualifier mismatch, however it is allowed to continue. If the OS volume catalog is correctly read and parsed the process continues to see if it is valid for the current factory operation.

The matching process iterates through all qualifiers that are present in the current provisioning data 116. For each qualifier a set of steps is performed:

1) Determine if there is a name match. If the name of the template in the catalog matches the name of the current qualifier, including wildcard evaluation, the matching process continues, otherwise the current qualifier is discarded.

2) Determine if there is a version match. Using the version and version rule from the qualifier, determine if the catalog version matches the qualifier. If there is a match the matching process continues, otherwise the current qualifier is discarded.

3) Check the catalog signing key. Determine whether the current qualifier has an exact match for the signing key in the catalog, if these are equal the matching process continues, otherwise the current qualifier is discarded.

4) Since the current qualifier matches the catalog, it is added to the list of possible qualifiers.

The matching process continues until all qualifiers in the list supplied in the MK are exhausted. At the end of matching if there are no qualifiers then the operation is marked as a volume qualifier mismatch. The PTM processing is allowed to continue however.

If one or more qualifiers match the volume catalog the signature on the catalog is checked using the public key supplied, with it. This operation proves that the publisher did in fact possess the correct private signing key.

OS Volume Unlock

The PTM next determines if the OS volume requires an unlock key. OS volumes are FVE encrypted, however FVE protection is suspended for signed-only templates. The PTM uses the matched volume qualifiers from the matching process since each such qualifier contains zero or one external FVE keys. The PTM iterates through the list of keys attempting to unlock the template OS volume.

If FVE is suspended on the target then the TPM internally flags the volume as signed-only. If FVE is not suspended on the template OS volume and no key will unlock that volume then the PTM fails and returns an error to the secure VM factory. At this point if the operation has been previously marked as a volume qualifier mismatch then it is a signed-only volume since there is no available key.

Template Processing Mode Determination

The PTM next determines how to process the OS volume. To begin this two variables are set to initial values:

1) FVEK-REKEY—Set to TRUE.
2) HASH—Set to TRUE.

The PTM looks at the factory data from the PDK and determines if FVEK Re-encrypt is specified in that data. If the value is present, and the value is set to FALSE and the current template is NOT marked as signed-only then the value of FVEK-REKEY is set to FALSE.

Next the PTM looks at the factory data value governing volume signature checking. If the factory data specifies that the signature does not need to be checked and the volume is not a signed-only template then the value of HASH is set to FALSE.

Template Processing

The PTM next processes the template. If either FVEK-REKEY or HASH is TRUE then the PTM sets up a full volume sweep. The full volume sweep uses a very limited scanner to determine used spaces in the volume. The process is initialized as follows:

1) If HASH—TRUE→Initialize volume hash calculation.
2) If FVEK-REKEY—TRUE→Generate New FVEK.

Using this ability the PTM iterates over each block on the disk performing the following processing:

1) Read new block.
2) If HASH=TRUE→Extend volume hash using new block.
3) If FVEK-REKEY=TRUE→
a) Decrypt block using existing FVEK.
b) Encrypt block using New FVEK.
c) Update block in place on disk.

At the end of processing (if any was required) the PTM generates a new TPM protector for FVE using the current VM's TPM (a virtual TPM). The new TPM protector added to the FVE metadata and all three copies are updated on the OS volume.

Signature Check

If the HASH variable is set to true then calculated OS hash is now compared to the hash that was present and authenticated in the OS volume catalog. If the hashes do not match then an error is returned from the PTM. Once this final step has completed the VIM has concluded its work and the template disk has been fully processed.

Specialization Agent

If the secure VM factory determines that the PTM has completed execution and has not signaled any errors it then launches the Specialization Agent (SA). The SA is passed the specialization portion of the PDK. At this stage in the factory execution the target OS disk is encrypted and protected with a unique TPM key. It is now safe to write sensitive data to the protected VM's OS volume without concern that it may be compromised.

The SA can perform any actions that are required to specialize the OS within the original template disk to the unique target instance. In general there exists a combination of two types of operations that are performed:

1) Offline—These are operations that the SA can perform on the offline OS instance itself. The SA should perform as much offline specialization of the target as possible.

2) Online Preparation—For any operations that cannot be performed offline the SA may write data to the OS volume to allow online operations to occur when the target OS boots.

OS First Boot

Once the secure VM factory has completed processing the normal OS boot continues. The boot state of the hardware, firmware and TPM is consistent with the existing OS boot environment and, specifically, the TPM PCRs 7 and 11 are in a state that allows FVE to unlock the OS volume (Note: As a shortcut to this, embodiments may pre-create the keyring from the PTM).

Some embodiments enable customers to use FVE full volume encryption over existing hardware and hosts, with multiple versions of guest operating systems. To accomplish this embodiments may provide tenants with tools and instructions to enable FVE encryption on volumes in the following ways:

Data Volumes: All data volumes are FVE, encrypted with an automatic unlock key stored within the OS volume (for example, in the Windows registry for Windows operating systems available from Microsoft Corporation of Redmond, Wash.). These volumes are automatically unlocked if they are mounted within the correct OS.

OS Volumes: Each protected VM has an OS volume that is FVE encrypted. When the FVE encryption is performed the external recovery key is saved to a file, by FVE. This file is uploaded to a protected location within a cloud service provider.

The cloud service provider manages the customer's FVE key for the customer as protected data. When required, the fabric controller (FC) instructs a specific compute node to retrieve and run a customer VM. The Fabric Agent (EA) on the compute node requests the FVE OS volume key from the FC. The FC returns the file with the recovery key to the FA.

In some embodiments, each compute node that is capable of hosting a protected VM has a small—in some embodiments, approximately 3 GB—volume called SCRATCH. Upon each boot, as the FA starts, the FA performs the following steps:

1) Format SCRATCH: The volume is formatted as a blank volume (in some embodiments, as an NTFS volume).
2) FVE SCRATCH: The SCRATCH volume is FVE protected. The key is saved within a file on the OS volume.
3) Key Delete: The key for the SCRATCH volume is cryptographically deleted (overwritten) to make it inaccessible.

Once these steps have been taken the host has a small volume that is encrypted but accessible for the duration of the current boot cycle. Once the machine is shut down the contents of the volume can never be accessed again.

When the FA receives the file with the recovery key for a protected. VM, it creates a new VHD file within the SCRATCH volume. This is a minimally sized dynamic VHD. The FA writes the file with the recovery key into the new volume and access control the file and directory to remove all access. Subsequently the FA dismounts the new VHD from the root partition.

The FA attaches the new SCRATCH VHD to the protected VM and start the VM. Within the VM's boot environment the firmware enumerates the disks including the SCRATCH disk containing the file with the recover key. The OS volume unlock code in the boot environment locates the correct file with the recover key and unlocks the OS volume, allowing the OS to boot. Once the guest OS has booted, the SCRATCH volume remains attached and is used any time the guest reboots. The contents of the file with the recover key are only accessible to an administrative user that can change the protections on the directory and file.

Once the OS has booted, the OS is capable of automatically unlocking any data volumes that have been correctly FVE protected.

Provisioning

Provisioning of protected VMs is expected to be performed in one of two ways:

1) In-Place Conversion—In this model an existing VM is protected in-place by using FVE to encrypt the OS, as well as possibly other, disk volumes.

2) Upload—This model allows a customer to create a protected VM on premises and upload that VM to the cloud service. The resulting VM never exists within the cloud service in an unprotected state.

Once a protected. VM has been created, there is a single key that is required to unlock the FVE protected OS volume. In either provisioning method an external FVE key is created which is backed up to a file for recovery. The resulting file contains a key that can be used to permit access to the drive. The file is protected data and is protected using tenant secrets management. From a provisioning perspective the external key is provided as part of a provisioning process that occurs at every VM reboot.

Operation

The protected VM relies upon a trusted fabric. Within the trusted fabric the provisioning service resides within the Fabric Agent (FA) on each compute node. The FA is able to access the FVE external key and provide that to the VM through a channel that includes a VHD attached to the VM.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

While much of the preceding has been illustrated in virtual machine environments, it should be appreciated the concepts can be implemented in physical machine environments as well. Thus, unless otherwise specified, the claims herein may be applied to physical machines, virtual machines, or combinations thereof.

Figure 4:
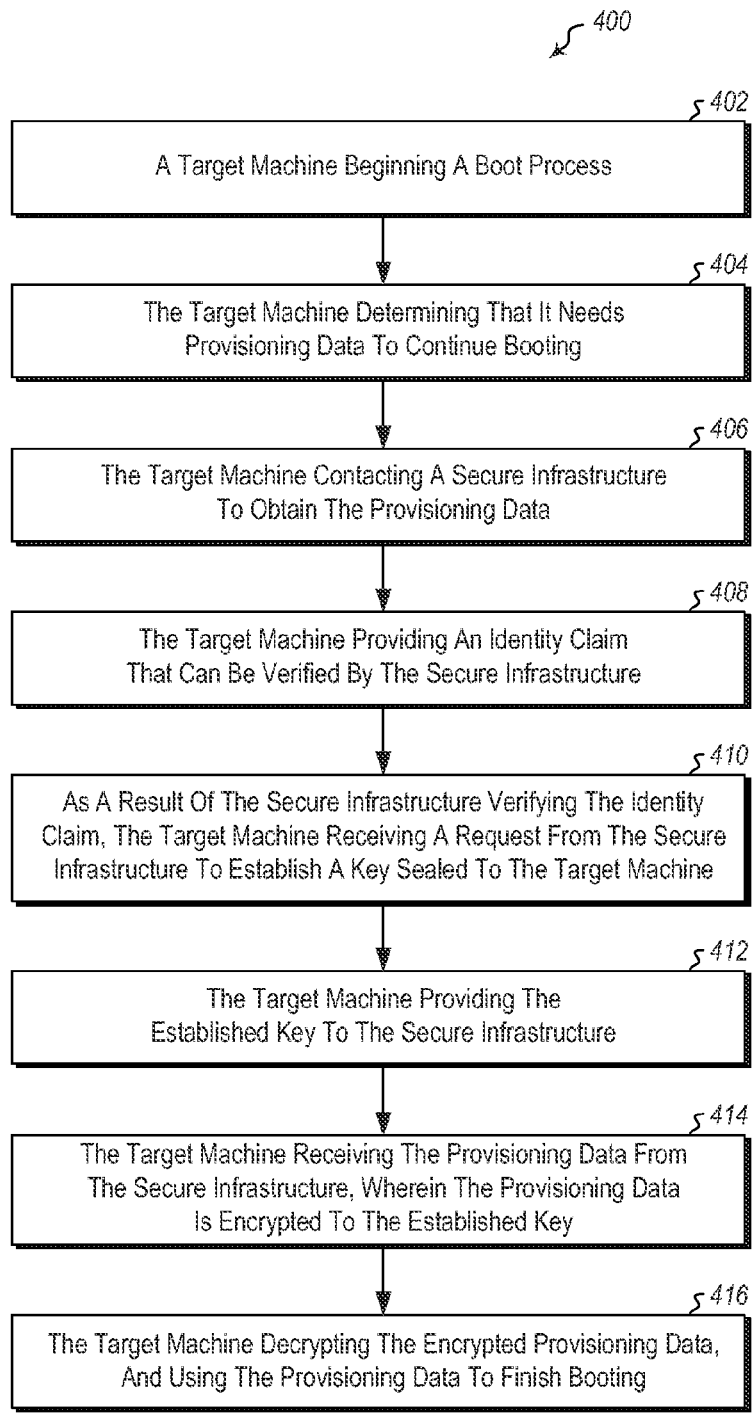
FIG. 4 illustrates a method of booting a machine in a secure fashion in a potentially unsecure environment.

Referring now to FIG. 4, a method 400 is illustrated. The method 400 may be practiced in a computing environment. The method includes acts for booting a machine in a secure fashion in a potentially unsecure environment. The method 400 includes a target machine beginning boot process (act 402). For example, FIG. 3 illustrates an example where the target machine is the guest virtual machine 102. The guest virtual machine 102 may begin a boot process.

The method 400 further includes the target machine determining that it needs provisioning data to continue booting (act 404). Thus, for example, the guest virtual machine 102 may determine that it needs provisioning data 116 to finish booting. Such provisioning data may include, for example, various specific items of data, such as usernames, passwords, machine settings, etc.

The method 400 further includes the target machine contacting a secure infrastructure to obtain the provisioning data (act 406). For example, the secure infrastructure may include elements such as the VSM 266 of the virtual machine 102 and/or the KDS 114.

The method 400 further includes the target machine providing an identity claim that can be verified by the secure infrastructure (act 408). For example, the virtual machine 102 may provide an identity claim identifying the virtual machine 102 to the KDS 114.

As a result of the secure infrastructure verifying the identity claim, the method 400 further includes the target machine receiving a request from the secure infrastructure to establish a key sealed to the target machine (act 410). Thus, in the illustrated example, the virtual machine 102 may receive a request to establish a key.

The method 400 further includes the target machine providing the established key to the secure infrastructure (act 412). The virtual machine 102 may establish the key 112 and provide this key to the secure infrastructure.

The method 400 further includes the target ma receiving the provisioning data from the secure infrastructure, wherein the provisioning data is encrypted to the established key (act 414). Thus, for example, the provisioning service 206 may encrypt the provisioning data 116 using the key 112 provided by the KDS 114.

The method 400 further includes the target machine decrypting the encrypted provisioning data, and using the provisioning data to finish booting (act 416. Thus, the VM 102 may use the key to decrypt the provisioning data 116 and use this data to finish booting the VM 102.

While the example above illustrates using the provisioning data to boot a virtual machine on a host, it should be appreciated that in other embodiments, the provisioning data may be used of other machines and/or environments. For example, the provisioning data may be used to boot various physical machines and/or boot machines in various networked and/or clustered environments.

For example, the method 400 may be practiced where using the provisioning data to finish booting comprises using the provisioning data to connect to network storage to perform a network boot. Alternatively or additionally, the method 400 may be practiced where using the provisioning data to finish booting comprises using the provisioning data to join a cluster of machines. Alternatively or additionally, the method 400 may be practiced where using the provisioning data to finish booting comprises using the provisioning data to create a virtual machine (VM) on a host where the provisioning data comprises data for the VM.

The method 400 may be practiced where the target machine begins the boot process based on a template. In some such embodiments, the method may further include using the provisioning data to verify that the template is acceptable for use in booting the target machine. Alternatively or additionally, in such embodiments, the method may further include re-encrypting the template to the target machine as part of verifying the template to prevent tampering with the template after portions of the template have been verified. In some embodiments re-encrypting the template to the target machine may include performing a TPM sealing.

In some embodiments, the method 400 may further include injecting secret data (e.g. passwords, certificates, passwords, cryptographic keys, etc.) into the target machine after verifying that a template is acceptable for use in booting the target machine.

Some embodiments of the method 400 may further include receiving non-secret data to be injected into the target machine (e.g. from a VMM such as the fabric manager 254). The method may further include determining that the non-secret data is data in a category of non-secret data that is allowed to be injected into the target machine. The method may farther include, as a result, injecting the non-secret data into the target machine.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of booting a machine in a secure fashion in a potentially unsecure environment, the method comprising:
   a target machine beginning a boot process based on a template;
   the target machine determining that it needs provisioning data to continue booting;
   the target machine contacting a secure infrastructure to obtain the provisioning data;
   the target machine providing an identity claim that can be verified by the secure infrastructure;

as a result of the secure infrastructure verifying the identity claim, the target machine receiving a request from the secure infrastructure to establish a key sealed to the target machine;

the target machine providing the established key to the secure infrastructure;

the target machine receiving the provisioning data from the secure infrastructure, wherein the provisioning data is encrypted to the established key; and the target machine decrypting the encrypted provisioning data, and using the provisioning data to verify that the template is acceptable for use in booting the target machine, and then using the provisioning data to finish booting the target machine.

2. The method of claim 1, wherein using the provisioning data to finish booting comprises using the provisioning data to connect to network storage to perform a network boot.

3. The method of claim 1, wherein using the provisioning data to finish booting comprises using the provisioning data to join a cluster of machines.

4. The method of claim 1, wherein using the provisioning data to finish booting comprises using the provisioning data to create a virtual machine (VM) on a host where the provisioning data comprises data for the VM.

5. The method of claim 1, further comprising re-encrypting the template to the target machine as part of verifying the template to prevent tampering with the template after portions of the template have been verified.

6. The method of claim 1, further comprising injecting secret data into the target machine after verifying that the template is acceptable for use in booting the target machine.

7. The method of claim 1, further comprising:
receiving non-secret data to be injected into the target machine;
determining that the non-secret data is data in a category of non-secret data that is allowed to be injected into the target machine; and
as a result, injecting the non-secret data into the target machine.

8. In a computing environment, one or more computer readable physical storage media comprising computer executable instructions stored thereon that when executed by one or more processors cause the following to be performed:
a target machine beginning a boot process wherein the target machine begins the boot process based on a template;
the target machine determining that it needs provisioning data to continue booting;
the target machine contacting a secure infrastructure to obtain the provisioning data;
the target machine providing an identity claim that can be verified by the secure infrastructure;
as a result of the secure infrastructure verifying the identity claim, the target machine receiving a request from the secure infrastructure to establish a key sealed to the target machine;
the target machine providing the established key to the secure infrastructure;
the target machine receiving the provisioning data from the secure infrastructure, wherein the provisioning data is encrypted to the established key;
the target machine decrypting the encrypted provisioning data;
the target machine using the provisioning data to verify that the template is acceptable for use in booting the target machine; and
the target machine using the provisioning data to finish booting.

9. The one or more computer readable storage media of claim 8, further comprising computer executable instructions stored thereon that when executed by one or more processors cause the re-encrypting the template to the target machine as part of verifying the template to prevent tampering with the template after portions of the template have been verified.

10. The one or more computer readable storage media of claim 8, further comprising computer executable instruction stored thereon that when executed by one or more processors cause the following to be performed:
receiving non-secret data to be injected into the target machine;
determining that the non-secret data is data in a category of non-secret data that is allowed to be injected into the target machine; and
as a result, injecting the non-secret data into the target machine.

11. A computing system comprising one or more processors executing computer executable instructions which, when executed, configure the computing system with an architecture that boots a target machine in a secure fashion in a potentially unsecure environment, and wherein the architecture performs the following:
begins a boot process for a target machine based on a template;
makes a determination that provisioning data is needed to continue booting;
contacts a secure infrastructure to obtain the provisioning data;
provides an identity claim that can be verified by the secure infrastructure;
as a result of the secure infrastructure verifying the identity claim, receives a request from the secure infrastructure to establish a key sealed to the target machine;
provides the established key to the secure infrastructure;
receives the provisioning data from the secure infrastructure, wherein the provisioning data is encrypted to the established key; and
decrypts the encrypted provisioning data, and uses the provisioning data to verify that the template is acceptable for use in booting the target machine, and then uses the provisioning data to finish booting the target machine.

12. The system of claim 11, wherein using the provisioning data to finish booting comprises using the provisioning data to connect to network storage to perform a network boot.

13. The system of claim 11, wherein using the provisioning data to finish booting comprises using the provisioning data to join a cluster of machines.

14. The system of claim 11, wherein using the provisioning data to finish booting comprises using the provisioning data to create a virtual machine (VM) on a host where the provisioning data comprises data for the VM.

15. The system of claim 11, wherein the architecture further performs the following:
re-encrypts the template to the target machine as part of verifying the template to prevent tampering with the template after portions of the template have been verified.

16. The system of claim 11, wherein the architecture further performs the following:

injects secret data into the target machine after verifying that the template is acceptable for use in booting the target machine.

17. The system of claim 11, wherein the architecture further performs the following:
receives non-secret data to be injected into the target machine;
determines that the non-secret data is data in a category of non-secret data that is allowed to be injected into the target machine; and
as a result, injects the non-secret data into the target machine.

* * * * *